US009041801B2

(12) United States Patent
Schweikart

(10) Patent No.: US 9,041,801 B2
(45) Date of Patent: May 26, 2015

(54) MINE OPERATION MONITORING SYSTEM

(75) Inventor: Victor Schweikart, Melbourne (AU)

(73) Assignee: Technological Resources PTY. Limited, Melbourne, Victoria (AU)

(*) Notice: Subject to any disclaimer, the term of this patent is extended or adjusted under 35 U.S.C. 154(b) by 433 days.

(21) Appl. No.: 13/323,410

(22) Filed: Dec. 12, 2011

(65) Prior Publication Data

US 2012/0281089 A1 Nov. 8, 2012

Related U.S. Application Data

(63) Continuation-in-part of application No. PCT/AU2010/000733, filed on Jun. 14, 2010.

(30) Foreign Application Priority Data

Jun. 12, 2009 (AU) .............................. 2009902732
Jun. 12, 2009 (AU) .............................. 2009902750

(51) Int. Cl.
*H04N 7/18* (2006.01)
*E21C 41/00* (2006.01)
*E21C 35/24* (2006.01)
*G06Q 10/06* (2012.01)

(52) U.S. Cl.
CPC ................. *E21C 41/00* (2013.01); *E21C 35/24* (2013.01); *G05B 2219/13* (2013.01); *G06Q 10/06311* (2013.01)

(58) Field of Classification Search
CPC .... E21C 35/24; E21C 41/00; G06Q 10/06311
See application file for complete search history.

(56) References Cited

U.S. PATENT DOCUMENTS

| 3,979,731 | A | 9/1976 | Naplatanov et al. |
| 6,778,097 | B1 | 8/2004 | Kajita et al. |
| 6,988,591 | B2 | 1/2006 | Uranaka et al. |
| 2007/0093925 | A1 | 4/2007 | Moughler |
| 2008/0015748 | A1 | 1/2008 | Nagy |
| 2008/0075079 | A1* | 3/2008 | Smith ........................... 370/392 |
| 2008/0082347 | A1 | 4/2008 | Villalobos et al. |
| 2009/0055029 | A1 | 2/2009 | Roberson et al. |
| 2009/0069044 | A1* | 3/2009 | Lintula et al. ................. 455/525 |

FOREIGN PATENT DOCUMENTS

WO  WO 2008/124765 A1  10/2008

OTHER PUBLICATIONS

International Search Report from the Australian Patent Office in International Application No. PCT/AU2010/000733 mailed Oct. 19, 2010.

* cited by examiner

*Primary Examiner* — Huy T Nguyen
(74) *Attorney, Agent, or Firm* — Banner & Witcoff, Ltd.

(57) ABSTRACT

A mine operation monitoring system a plurality of mine equipment interfaces each being located at a mine operation and being associated with at least one item of mine equipment, each mine equipment interface being arranged to monitor operation of the at least one associated item of mine equipment. A plurality of monitoring stations is located remotely to the mine operations and is arranged to communicate with at least one equipment interface associated with a different mine operation so as to monitor operation of at least one item of mine equipment associated with said at least one equipment interface from the remote locations. A plurality of local monitoring stations located at respective mine operations monitors operation of the one time of equipment associated with the one interface. A communications network is arranged to facilitate communications between the equipment interfaces, the local monitoring stations and the remote monitoring stations.

27 Claims, 8 Drawing Sheets

MINE OPERATION MONITORING SYSTEM

CROSS REFERENCE TO RELATED APPLICATIONS

This application is a continuation-in-part application of International Application No. PCT/AU2010/000733, filed Jun. 14, 2010, which claims priority of Australian Application No. 2009902732, filed Jun. 12, 2009 and Australian Application No. 2009902750, filed Jun. 12, 2009; the content of all of which is incorporated herein by reference.

FIELD OF THE INVENTION

The present invention relates to a mine operation monitoring system for monitoring and/or controlling equipment at a plurality of mine operations.

BACKGROUND OF THE INVENTION

It is known to provide a mine operation such as a mine site with a monitoring station arranged to facilitate control and/or monitoring of mine equipment by mining personnel.

However, with such a monitoring station it is necessary for operators to travel to the mine operation, which can be expensive for mining operators and, moreover, the mine operations are often disposed at relatively remote locations, which is undesirable for many operators.

In addition, with the current arrangement wherein a monitoring station is provided at each mining operation, it is difficult for a mining company to holistically manage several mining operations.

SUMMARY OF THE INVENTION

It will be understood that in the present specification a mine operation means any operation or facility associated with extracting, handling, processing and/or transporting bulk commodities in a resource extraction environment or part of such a process, for example mine sites, rail facilities, port facilities, and associated infrastructure.

In accordance with a first aspect of the present invention, there is provided a mine operation monitoring system comprising:
  a plurality of equipment interfaces, each equipment interface being located at a mine operation and being associated with at least one item of mine equipment, and each equipment interface being arranged to monitor and control operation of the at least one associated item of equipment;
  a plurality of remote monitoring stations remotely located relative to at least one of the mine operations at a remote monitoring facility, each remote monitoring station being arranged to communicate with at least one equipment interface associated with a different mine operation so as to monitor and control operation of the at least one item of equipment associated with said at least one equipment interface from the remote monitoring station; and
  a communications network arranged to facilitate communications between the equipment interfaces and the remote monitoring stations;
  whereby a plurality of items of equipment associated with multiple mine operations are monitorable and controllable from the remote monitoring facility.

In one embodiment, the system comprises
  a plurality of local monitoring stations, each local monitoring station being located at a mine operation, and being arranged to communicate with the at least one equipment interface associated with the mine operation so as to monitor and control operation of the at least one item of equipment associated with the at least one equipment interface from the mine operation;
  wherein a plurality of items of equipment associated with multiple mine operations are monitorable and controllable from the remote monitoring facility and each item of equipment is also monitorable and controllable from the respective local monitoring station.

In one embodiment, each mine equipment interface is arranged to control operation of the at least one associated item of mine equipment in response to a control signal, and each of the local and remote monitoring stations is arranged to send control signals to the mine equipment interfaces in response to operator input.

In one embodiment, each mine equipment interface comprises at least one programmable logic controller (PLC).

In one embodiment, at least one of the mine operations is provided with a control server arranged to receive control commands for at least one item of equipment associated with the mine operation and to generate control signals for controlling operation of the at least one item of equipment in response to the control commands.

In one embodiment, the system further comprises a local VOIP device at at least one mine operation and a remote VOIP device at the remote monitoring facility, the local and remote VOIP devices facilitating audio communications between the at least one mine operation and the remote monitoring facility through the communications network.

In one embodiment, the system comprises at least one local A/V device disposed at a mine operation and arranged to capture audio and/or video information from the mine operation and at least one remote A/V client device disposed at the remote monitoring facility, the local and remote A/V devices facilitating audio and/or video communications between the mine operation and the remote monitoring facility.

The system may be arranged to use a multi-cast protocol to transmit A/V communications indicative of the audio and/or video information to the remote monitoring facility such that multiple operators are able to simultaneously receive the A/V communications.

In one embodiment, the system further comprises a still and/or video camera at at least one mine operation, and a display disposed at the remote monitoring facility, the system being arranged to display images captured by said at least one camera on the display. The display may be of sufficient size such that the images on the display are easily viewable by all operators at the remote monitoring facility. In one embodiment, the system is arranged such that images associated with multiple still and/or video cameras are viewable on the display, and may be arranged such that images associated with multiple still and/or video cameras located at multiple mine operations are viewable on the display.

In one embodiment, the mine operations comprise at least one mine site, at least one port facility and/or at least one rail network.

In one embodiment, the system is arranged to monitor whether communications between the remote monitoring facility and the mine operations are possible and to generate an alarm signal when an indication is obtained that a communications outage may have occurred between the remote monitoring facility and one of more mine operations. The system may be arranged to require that a handshake occurs periodically between the remote monitoring facility and the mine operations, such as by configuring the equipment interfaces to periodically send a heartbeat communication to an associated remote monitoring station, and by configuring the remote monitoring stations to send a reply signal indicating that the heartbeat communication has been received.

The system may further be arranged to prioritise communications between the mine operations and the remote monitoring facility according to communication type. In one embodiment, the system may be arranged to prioritise communications by allocating different bandwidth percentages to different types of communications, such as to communications related to monitoring and control activities, VOIP communications, CCTV data, email, file transfers, and so on. In one arrangement, communications related to monitoring and control activities, and VOIP communications are given higher bandwidth percentages than CCTV data, email and file transfers. In an alternative embodiment, different types of communications are allocated different priority values which are used by routers in the communications network to manage queues in the routers and thereby the speed of transfer of the communications through the routers.

The priority values may be allocated according to the IP addresses associated with a communication.

In one embodiment, the IP addresses of all network enabled devices in the system are recorded in system routers and the priority level allocated by the routers according to the priority level recorded for the network addresses in the routers.

In one embodiment, all communications to or from a network enabled device having an IP address that is not associated with a communication between a mine operation and the remote monitoring facility are allocated a priority level lower than communications between a mine operation and the remote monitoring facility.

In one embodiment, the communications network comprises multiple network paths for transferring communications between each mine operation and the remote monitoring facility so that a backup network connection is available should one or more network connection fail between the mine operations and the remote monitoring facility.

In one embodiment, the communications network comprises a plurality of nodes between a mine operation and the remote monitoring facility, the communications network being arranged such that network traffic through the communications network is re-routable through the nodes should an outage occur at a communications link between at least two nodes.

In one embodiment, each remote or local monitoring station comprises at least one computer terminal, each terminal being arranged to monitor mine equipment at a mine operation. At least one remote or local monitoring station may comprise a plurality of computer terminals. In one embodiment, a plurality of terminals are provided for at least one operator so that the operator is able to monitor a plurality of mine equipment simultaneously.

In one embodiment, at least one of the terminals comprises a web browser and the system is arranged such that mine equipment is monitorable and controllable within a web browser. The system may be arranged such that a representation of the mine equipment being monitored and/or controlled is displayed on a terminal.

The computer terminals may be realized using multiple computing devices, or using at least one terminal server and at least one thin client device.

In one embodiment, the system further comprises an audio messaging system usable to communicate audio between personnel at a mine operation and the remote monitoring facility. The audio messaging system may include at least one radio transmitter disposed at the mine operation, and at least one portable radio receiving device for use by mine personnel at the mine operation;
    data indicative of audio information received at the monitoring station being communicated to the radio transmitter through the communications network;
    the audio messaging system being arranged to convert the data to a radio signal indicative of the audio information; and
    the radio transmitter being arranged to transmit the radio signal to one or more of the radio receiving devices.

In one embodiment, the system comprises multiple network connection arrangements for connecting the remote monitoring stations with the communications network so that a backup network connection is available should one of the network connections between the remote monitoring facility and the communications network fail.

In one embodiment, the system comprises multiple power supply arrangements for supplying electrical power to the remote monitoring facility such that should supply of electrical power by one of the power supply arrangements to the remote monitoring facility fail, another power supply arrangement is used to provide the remote monitoring facility with electrical power.

In one embodiment, the remote monitoring facility is disposed at or adjacent an airport.

In accordance with a second aspect of the present invention, there is provided a mine operation monitoring system comprising:
    a plurality of equipment interfaces, each equipment interface being located at a mine operation and being associated with at least one item of equipment, and each equipment interface being arranged to monitor and control operation of the at least one associated item of equipment; and
    a local monitoring station disposed locally relative to the mine operation and arranged to communicate with the at least one equipment interface so as to monitor and control operation of the at least one item of equipment associated with the at least one equipment interface from the mine operation;
    the system being arranged to communicate with a remote monitoring station remotely located relative to the mine operation at a remote monitoring facility such that the at least one item of equipment associated with the mine operation is monitorable and controllable from the remote monitoring facility.

In accordance with a third aspect of the present invention, there is provided a mine operation monitoring facility for a plurality of mine equipment interfaces, each mine equipment interface being located at a mine operation and being associated with at least one item of mine equipment, and each equipment interface being arranged to monitor and control operation of said at least one item of mine equipment, the facility comprising:
    a plurality of adjacently disposed monitoring stations remotely located relative to the mine operations, each monitoring station being arranged to communicate through a wide area network with at least one equipment interface associated with a different mine operation so as to monitor and control operation of the at least one item of mine equipment associated with said at least one mine equipment interface from the monitoring facility;

whereby a plurality of items of mine equipment associated with multiple mine operations are monitorable and controllable from the same location.

In accordance with a fourth aspect of the present invention, there is provided a method of monitoring mine equipment at a plurality of mine operations, said method comprising:

providing a plurality of mine equipment interfaces, each mine equipment interface being located at a mine operation and being associated with at least one item of mine equipment;

arranging each mine equipment interface to monitor and control operation of the at least one item of mine equipment associated with the mine equipment interface;

providing a plurality of adjacently disposed remote monitoring stations remotely located relative to the mine operations at a remote monitoring facility;

facilitating communications between each remote monitoring station and at least one equipment interface associated with a different mine operation so as to monitor and control operation of the items of mine equipment associated with said at least one equipment interface from the remote location;

providing a plurality of local monitoring stations, each local monitoring station being locally located at a mine operation;

facilitating communications between each local monitoring station and the at least one mine equipment interface associated with the mine operation so as to monitor and control operation of the items of equipment associated with said at least one equipment interface from the mine operation; and monitoring and controlling a plurality of items of equipment associated with multiple mine operations either from the remote monitoring facility or from respective local monitoring stations.

In accordance with a fifth aspect of the present invention, there is provided a mine operation monitoring system for monitoring at least 4 mine operations, said system comprising:

a plurality of mine equipment interfaces, each mine equipment interface being located at a mine operation and being associated with at least one item of mine equipment, and each mine equipment interface being arranged to monitor and control operation of the at least one associated item of mine equipment;

at least 4 remote monitoring stations remotely located relative to the mine operations at a remote monitoring facility, each remote monitoring station being arranged to communicate with at least one equipment interface associated with a different mine operation so as to monitor and control operation of at least one item of mine equipment associated with said at least one equipment interface from the remote location;

at least 4 local monitoring stations, each local monitoring station being located at a mine operation, and being arranged to communicate with the at least one mine equipment interface associated with the mine operation so as to monitor and control operation of the at least one item of equipment associated with said at least one equipment interface from the mine operation; and a communications network arranged to facilitate communications between the equipment interfaces, the local monitoring stations and the remote monitoring stations; whereby a plurality of items of equipment associated with at least 4 mine operations are monitorable and controllable either from the remote monitoring facility or from respective local monitoring stations.

In accordance with a sixth aspect of the present invention, there is provided a system for controlling from a central operations facility plant and equipment associated with a plurality of mine sites for producing bulk commodities and associated with one or more networks or rail lines for transportation of said bulk commodities produced at said mine sites a distance exceeding 250 km to one or more port facilities and associated with said one or more port facilities, the plant and equipment connected to a communications network to thereby receive operating commands transmitted from operating stations connected to said communications network and operated by personnel and said operating stations receiving operating data transmitted by said plant and equipment over said communications network for display by said operating stations;

each one of said plurality of mine sites and each one of said one or more networks of rail lines and each one of said one or more port facilities having an associated operating station for local operation of said facilities;

the central operations facility having an operating station for each one of said plurality of mine sites and each one of said one or more networks of rail lines and each one of said one or more port facilities for remote operation of said facilities;

the communications network configured to carry at least real time voice traffic and e-mail traffic between said mine sites, said rail facilities, said port facilities and other facilities connected to said communications network; and said communications network configured to provide a latency of less than 1 second between:
i) transmittal of an operating command from an operating station located at the central operations facility to receipt of said command by said plant and equipment; or
ii) transmittal of operating data from plant and equipment to receipt of said operating data at said operations facility.

In accordance with a seventh aspect of the present invention, there is provided a system for controlling from a centralised operations facility plant and equipment associated with a plurality of mine sites distributed across a distance exceeding 250 km, the plant and equipment connected to a communications network to thereby receive operating commands transmitted from operating terminals connected to said communications network and operated by personnel;

said operating terminals receiving operating data transmitted by said plant and equipment over said communications network for display by said operating terminals;

each one of said plurality of mine sites having a plurality of operating terminals for local operation of said mine sites;

the centralised operations facility having a plurality of operating terminals for each one of said plurality of mine sites;

the communications network configured to carry at least real time voice traffic and e-mail traffic between said mine sites, said central operating facility and other facilities connected to said communications network; and said communications network configured to provide a latency of less than 1 second between:
i) transmittal of an operating command from an operating station located at the centralised operations facility to receipt of said command by said plant and equipment; or
ii) transmittal of operating data from plant and equipment to receipt of said operating data at said operations facility.

Preferably said latency is less than 0.5 seconds.

Preferably said system further controls operation of a rail network servicing said plurality of mine sites, the centralised operating facility comprising operating terminals for controlling plant and equipment of said rail network.

Preferably said system further controls operation of port facilities associated with said plurality of mine sites, the centralised operating facility comprising operating terminals for controlling plant and equipment located at said port facilities.

In accordance with a eighth aspect of the present invention, there is provided a system for controlling from a centralised operations facility plant and equipment associated with at least four mine sites distributed across a distance exceeding 250 km,
- the plant and equipment connected to a communications network to thereby receive operating commands transmitted from operating terminals connected to said communications network and operated by personnel;
- said operating terminals receiving operating data transmitted by said plant and equipment over said communications network for display by said operating terminals;
- each one of said at least four mine sites having a plurality of operating terminals for local operation of said mine sites;
- the centralised operations facility having a plurality of operating terminals for each one of said at least four mine sites;
- the communications network configured to carry at least real time voice traffic and e-mail traffic between said at least four mine sites, said central operating facility and other facilities connected to said communications network; and said communications network configured to provide a latency of less than 1 second between:
  i) transmittal of an operating command from an operating terminal located at the centralised operations facility to receipt of said command by plant and equipment at one of said at least four mine sites; or
  ii) transmittal of operating data from plant and equipment at one of said at least four mine sites to receipt of said operating data at said operations facility.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
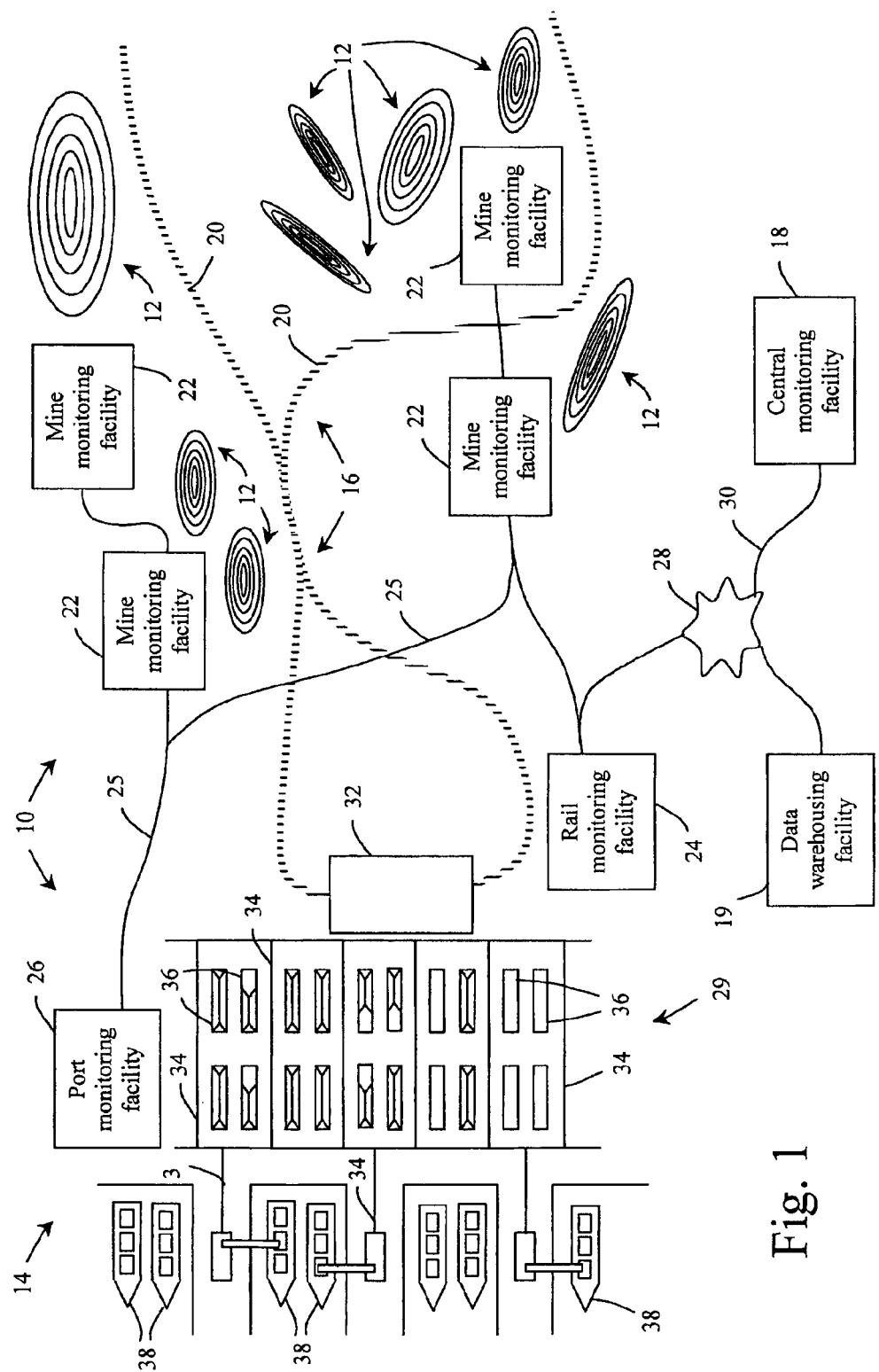
FIG. 1 is a schematic conceptual diagram illustrating a plurality of mine operations and components of a mine operation monitoring system according to an embodiment of the present invention.

An example conceptual diagram 10 illustrating relationships between mine operations and a central monitoring facility 18 is shown in FIG. 1. In this example, the mine operations comprise mine sites 12, a port facility 14 and a rail facility 16, although it will be understood that the invention is applicable to any operation associated with extracting, handling, processing or transporting bulk commodities in a mining environment.

In this example, the central monitoring facility 18 is remotely located relative to the mine sites 12, the rail network 16 and the port facility 14. Typically, the central monitoring facility 18 is situated at a significant distance from the mine sites 12, the rail network 16 and the port facility 14 such that it is impractical for daily commuting by operators via road or rail to the mine sites, the port facility and the rail network, for example a distance exceeding 250 km.

The conceptual diagram 10 shows a plurality of mine sites 12 which may be of open pit or underground type. The mine sites 12 typically produce a single bulk commodity, such as iron ore, coal or bauxite, and are serviced by the rail network 16 comprising rail lines 20 that transport the bulk commodities produced at the mine sites 12 to a port facility 14, or other facility incorporating a stock yard 29 for storage and/or processing of the bulk commodities.

Each mine site 12 has an associated locally disposed monitoring facility 22, the rail network 16 has an associated locally disposed rail monitoring facility 24 and the port facility 14 has an associated locally disposed port monitoring facility 26. Each local monitoring facility 22, 24, 26 communicates with a regional communications network 25 that in turn communicates with the central monitoring facility 18 via a wide area network (WAN) 28. The central monitoring facility 18 may be in communication with a metropolitan area network (MAN) 30 connected to the WAN 28.

The monitoring facilities 22, 24, 26 incorporate operator monitoring stations from which operators may monitor, activate, deactivate and control operation of plant and equipment at the mine sites 12, the rail network 16 and the port facility 14.

The central monitoring facility 18 incorporates a remote monitoring station for each mine operation 12, 14, 16. Using the remote monitoring stations, operators monitor, activate, deactivate and control operation of plant and equipment at the mine sites 12, the rail network 16 and the port facility 14.

The scheduling system may also include a data warehousing facility 19 in networked communication with the mine operations 12, 14, 16 and the central monitoring facility 18. The data warehousing facility 19 may be arranged to receive at least some operational data from the mine operations 12, 14, 16 and store the operational data in a data warehouse. The operational data stored in the data warehouse may be subsequently retrieved by the central monitoring facility 18.

In operation, each mine site 12 typically has daily, weekly, monthly and annual schedules for mining of ore and waste. Transportation of ore from each of the mine sites 12 to the port facility 14 is typically scheduled according to the daily, weekly and monthly schedules of the various mine sites 12. A stock yard 29 receives ore from the rail network 16 at a train load out facility 32 which places the ore onto conveyors 34 that in turn route the ore to a designated stock pile 36. The placement of ore onto the stockpiles 36 is scheduled so that the ore from the various mine sites 12 is blended to produce a uniform product prior to loading onto ships 38 at the port facility 14. Alternately, the stock piles 36 may be blended into various qualities of ores, such as high grade ore and low grade ore or ore with specific characteristics. Alternately, ore may be blended at each mine site 12 prior to railing so that each mine site 12 produces a specified average grade of ore that is then railed to the port facility 14. Under these conditions the ore is routed from the train load out facility 32 to a designated stock pile 36 without further blending.

In one embodiment, some operational data from each mine site 12, from the rail network 16 and from the port facility 14 is displayed centrally at the central monitoring facility 18. Preferably, the operational data for central display at the central monitoring facility 18 is updated at a rate that is at least an order of magnitude slower than the rate at which data at the operator monitoring stations is updated. This reduces, and preferably minimises, the bandwidth requirements between the central monitoring facility 18 and the mine sites 12, the rail network 16 and the port facility 14. Alternately, or in addition, some or all of the data for central display is sourced in association with the relevant monitoring stations so that bandwidth requirements of the communications network between the central monitoring facility 18 and the mine sites 12, the rail network 16 and the port facility 14 is reduced, and preferably minimised.

Plant and equipment at each mine site 12, within the rail network 16, and at the port facility 14 (including the stock yard facility 29) can be monitored and controlled from the local monitoring stations at the local monitoring facilities 22, 24, 26 and from the remote monitoring stations at the central monitoring facility 18.

The remote monitoring stations at the central monitoring facility 18 may be used to transmit operating commands to plant and equipment located at the mine sites 12, within the rail network 16 and at the port facility 14 (including the stock yard facility 29) via a communications network that includes the MAN 30, the WAN 28, and regional networks 25. Plant and equipment transmit operational data to the remote monitoring stations which in turn display the operational data on display screens for operators of the remote monitoring stations.

In a typical arrangement, plant and equipment servers located on site at the mine control facility 22, the rail control facility 24 (or other suitable location within the rail network 16) and at the port control facility 26 (or other suitable location) receive operating commands from the operator monitoring stations. The plant and equipment servers translate these operating commands into signals which may be implemented by the relevant item of plant/equipment associated with the signal and operating command or which may be received by an equipment interface such as a PLC which then instructs the plant/equipment to implement the command. The plant and equipment transmits operating signals to the relevant server which in turn transmits operational data for display on terminals of the operator monitoring stations. The operational data displayed on the terminals provides the operator(s) of the operator monitoring station(s) with information indicative of the operational status of the relevant plant and equipment.

Location of the plant and equipment servers and operator monitoring stations locally at the mine sites 12, the port facility 14 and the rail network 16 allows the plant and equipment to be monitored, operated and controlled locally in the event of an interruption to communications between the central monitoring facility 18 and any of the various mine, port and rail control facilities 22, 24, 26.

Location of the plant and equipment servers locally at the mine sites 12, the port facility 14 and the rail network 16 also ensures that network overheads are not too large during use.

In circumstances wherein the central monitoring facility 18 communicates with the mine control, rail control and port control facilities 22, 24, 26 over a corporate network that also carries e-mail, and other non-time-critical data traffic, it is preferable that the operating commands transmitted from the remote monitoring stations to plant and equipment servers and operational data received from the plant and equipment servers occur in real time or near real time such that an operator located at the central monitoring facility 18 perceives an average system response time between transmitting operating commands and seeing operational data displayed in response is less than 2.0 seconds. Preferably the delay is less than 1.5 seconds and preferably less than 1.0 seconds.

A particular embodiment of the mine operation monitoring system 10 for the mine operations 12, 14, 16 shown in FIG. 1 will now be described with reference to FIGS. 2, 3 and 4 of the drawings.

Each mine operation 12, 14, 16 includes equipment 40 which may be distributed around the mine operation, and each item of mine equipment 40 is electronically monitorable and controllable by an equipment interface device, in this example a mine equipment controller 42 which may be in the form of a programmable logic controller (PLC).

The equipment 40 at a mine site 12 may include crushers, screens, conveyor belts, stackers & reclaimers, train load out facilities, mobile equipment including trucks and excavators. The equipment at the rail network 16 may include locomotives, track based signalling systems, points, wayside equipment and wayside signals. The equipment at the port facility (including the stock yard 29) may include rail car unloading facilities, conveyor belts, stackers & reclaimers and ship loaders. However, it will be understood that any monitorable and/or controllable equipment for use in a mine operation is envisaged.

The mine equipment controllers 42 are each connected to a local network 44, which may be of LAN type. Also connected to the local network 44 is a control server 48 which is arranged to coordinate control of the items of mine equipment by the local monitoring station 46. The equipment controllers 42 through the control server 48 are arranged to receive control signals from and send signals to a local monitoring station 46 disposed at the mine operation 12, 14, 16.

Figure 3:
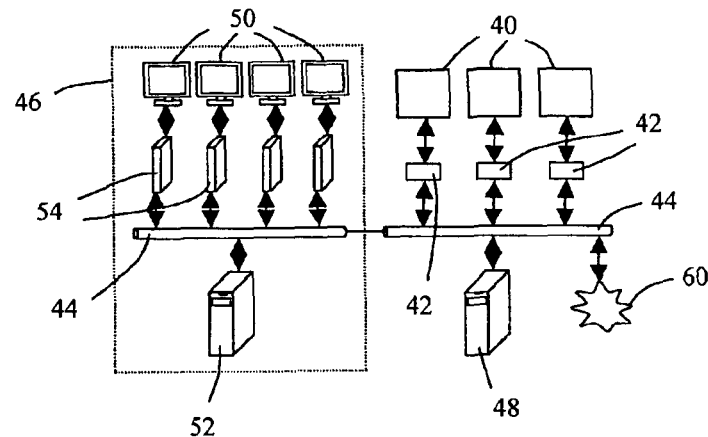
FIG. 3 is a diagrammatic representation showing components of the mine operation monitoring system disposed at a mine operation.
Figure 4:
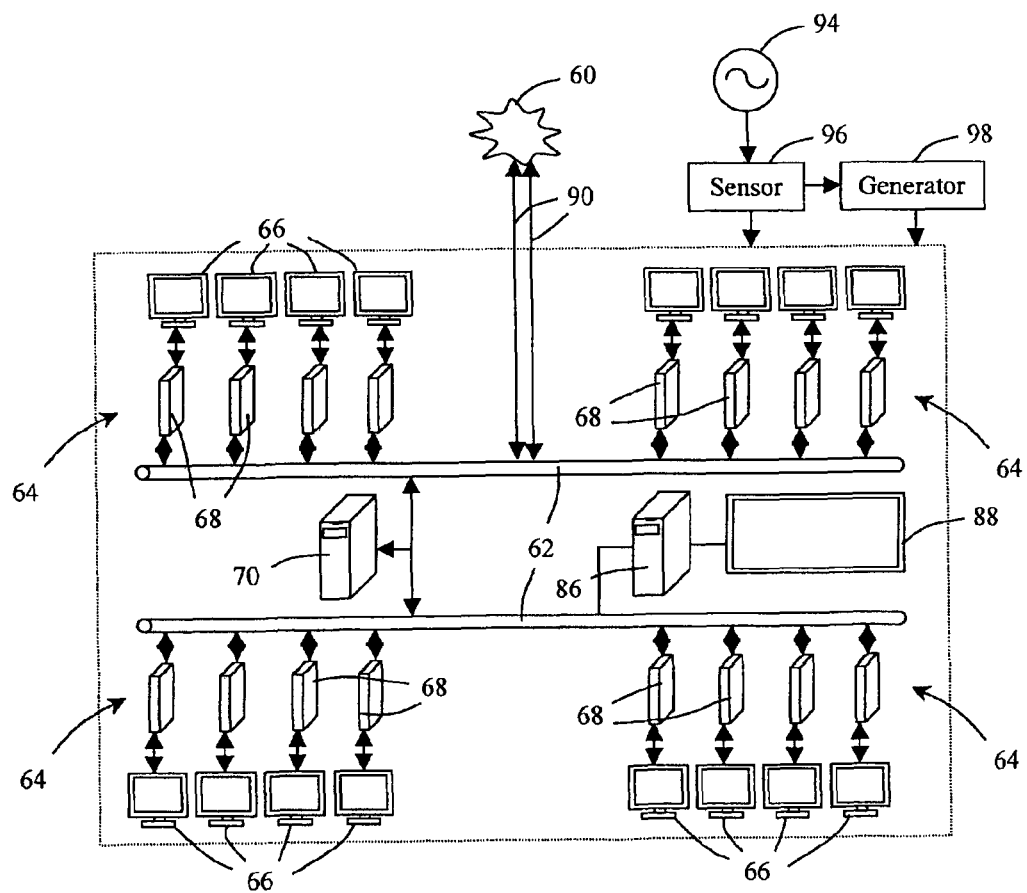
FIG. 4 is a diagrammatic representation showing components of the present invention disposed at a central monitoring facility.

As shown more particularly in FIG. 3, each local monitoring station 46 includes a plurality of terminals 50, each of which is arranged to display information indicative of and facilitate monitoring and/or control of different items of equipment 40 associated with the mine operation 12, 14, 16. For example, the terminals 50 may be arranged to enable mine personnel to monitor and control items of mine equipment 40 grouped by equipment type, equipment location, or in any other way.

In the present example, the terminals 50 are of thin client type and, as such, a terminal server 52 and a plurality of thin client devices 54 are provided. This arrangement allows multiple computing devices to be realised without the need to provide multiple full function personal computers. With this arrangement, most of the processing activity occurs at the terminal server 52 with the thin client devices 54 functioning to drive the respective displays on the terminals 50 and receive inputs from terminal operators.

However, it will be understood that other arrangements are possible. For example, instead of providing each terminal 50 with a respective thin client device 54, a single thin client device may be provided to drive the multiple terminals 50. As a further alternative, multiple full function computing devices may be used, the important aspect being that for each local monitoring station 46 sufficient computing terminals are realised for use by one or more operators in order to monitor and control the equipment 40 over the local network 44. In the present example, the terminals 50 communicate with the equipment 40 through the control server 48, with each terminal 50 being arranged to send communications to and receive communications from the control server 48 particular to one or more different groups of equipment 40.

Using the local monitoring stations 46, it is possible for operators located at a mine operation 12, 14, 16 to monitor and/or control mine equipment 40 associated with the mine operation 12, 14, 16. Typically there are a number of operators at each mine site, each operator oversees and controls the operation of various items of plant and/or equipment. Typically, each operator has their own terminal 50, or set of terminals 50, from which they monitor and control the various items of plant and equipment which they have responsibility for. These terminals 50, or set of terminals 50, are often located at different points around the mine and commonly are located in close proximity to the plant and/or equipment they control.

The local networks 44 at the respective mine operations 12, 14, 16 are connected to a wide area network (WAN), which may comprise the Internet 60, a dedicated wide area network (WAN), or any other suitable wide area communications network, and through the WAN 60 to the central monitoring facility 18, in this example disposed remotely relative to all of the mine operations 12, 14, 16, for example at a metropolitan location.

The central monitoring facility 18 comprises a network 62 which may be in the form of a local area network (LAN) in communication with the wide area network 60 and thereby with the respective local networks 44 at the mine operations 12, 14, 16.

The central monitoring facility 18 also comprises a plurality of remote monitoring stations 64, each of which in this example is associated with one of the mine operations 12, 14, 16. As shown in FIG. 4, each remote monitoring station 64 is similar in configuration to a local monitoring station 46 in that a plurality of terminals 66 are provided, each terminal 66 having an associated thin client device 68 and the thin client devices 68 communicating with a terminal server 70 through the network 62 in order to implement a plurality of computing devices at each monitoring station 64.

The remote monitoring stations 64 operate in a similar way to the local monitoring stations 66 in that a number of operators are able to use the terminals 66 associated with a remote monitoring station 64 to monitor and/or control mine equipment, with each remote monitoring station 64 typically being associated with one mine operation 12, 14, 16 and thereby with equipment 40 associated with the mine operation 12, 14, 16.

By providing a local monitoring station 46 at each mine operation 12, 14, 16, and a plurality of remote monitoring stations 44 associated with the respective mine operations 12, 14, 16 and disposed at a single remote location, it is possible to monitor and control mine equipment 40 at all of the mine operations from the same remote location, or to monitor and control the equipment 40 locally from the respective mine operations 12, 14, 16 if necessary, for example because communications between the mine operations 12, 14, 16 and the central monitoring facility have broken down or deteriorated to the extent that monitoring and/or control from the central monitoring facility is not feasible.

By disposing all monitoring stations for the mine operations at the same location, significant cost savings can be achieved, particularly if the central monitoring facility is disposed at a metropolitan location since the need for operators to travel to the mine operations, which are often at relatively remote locations, in order to carry out the monitoring and/or control operations is reduced.

Figure 5:
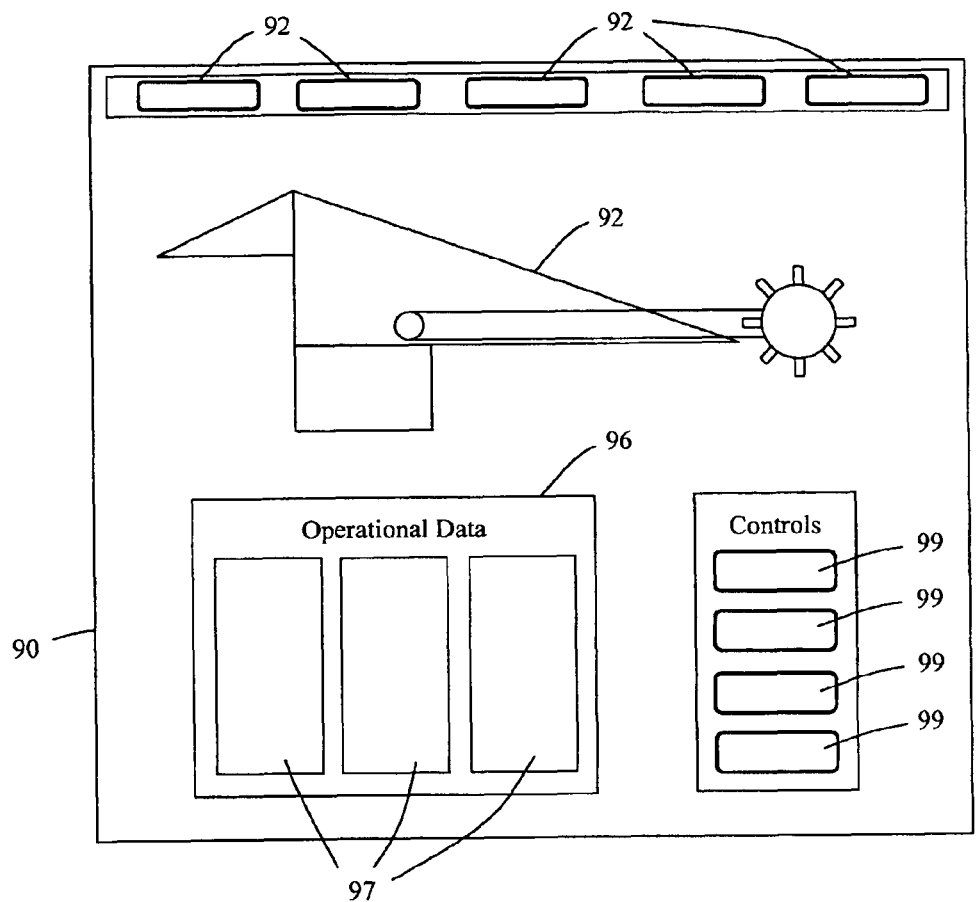
FIG. 5 is a diagrammatic representation of an example screen displayed to an operator at a monitoring station at a mine operation or at a central monitoring facility

An example screen 90 displayed to an operator at a terminal 50 disposed at a local monitoring station 22, 24, 24 or disposed at the central monitoring facility 18 is shown in FIG. 5.

The screen 90 includes navigation controls 92 usable to display desired control and/or monitoring screens associated with one or more items of plant and/ore equipment.

In the screen shown in FIG. 5, a reclaimer is being monitored and controlled and a representation of the reclaimer 94 is shown on the screen. The representation of the reclaimer 94 may be modified according to the operational status of the reclaimer. For example, the colour of the reclaimer may change depending on whether the reclaimer is currently operating or on stand-by. The representation of the reclaimer 94 may also show that the reclaimer is functioning by showing parts of the reclaimer moving.

The screen 90 also shows an operational data display area 96 including relevant operational data 97 indicative of current status of the reclaimer such as the reclaim rate, speed of bucketwheel, maintenance information, and so on.

The screen 90 also shows a control display area 98 including control buttons 99 usable to modify operational parameters, such as speed of bucketwheel, to turn the reclaimer on or off, and so on.

In this example, the screen 90 displayed to an operator is implemented using a web browser arranged to communicate with control servers 48 associated with the mine operations 12, 14, 16.

Figure 2:
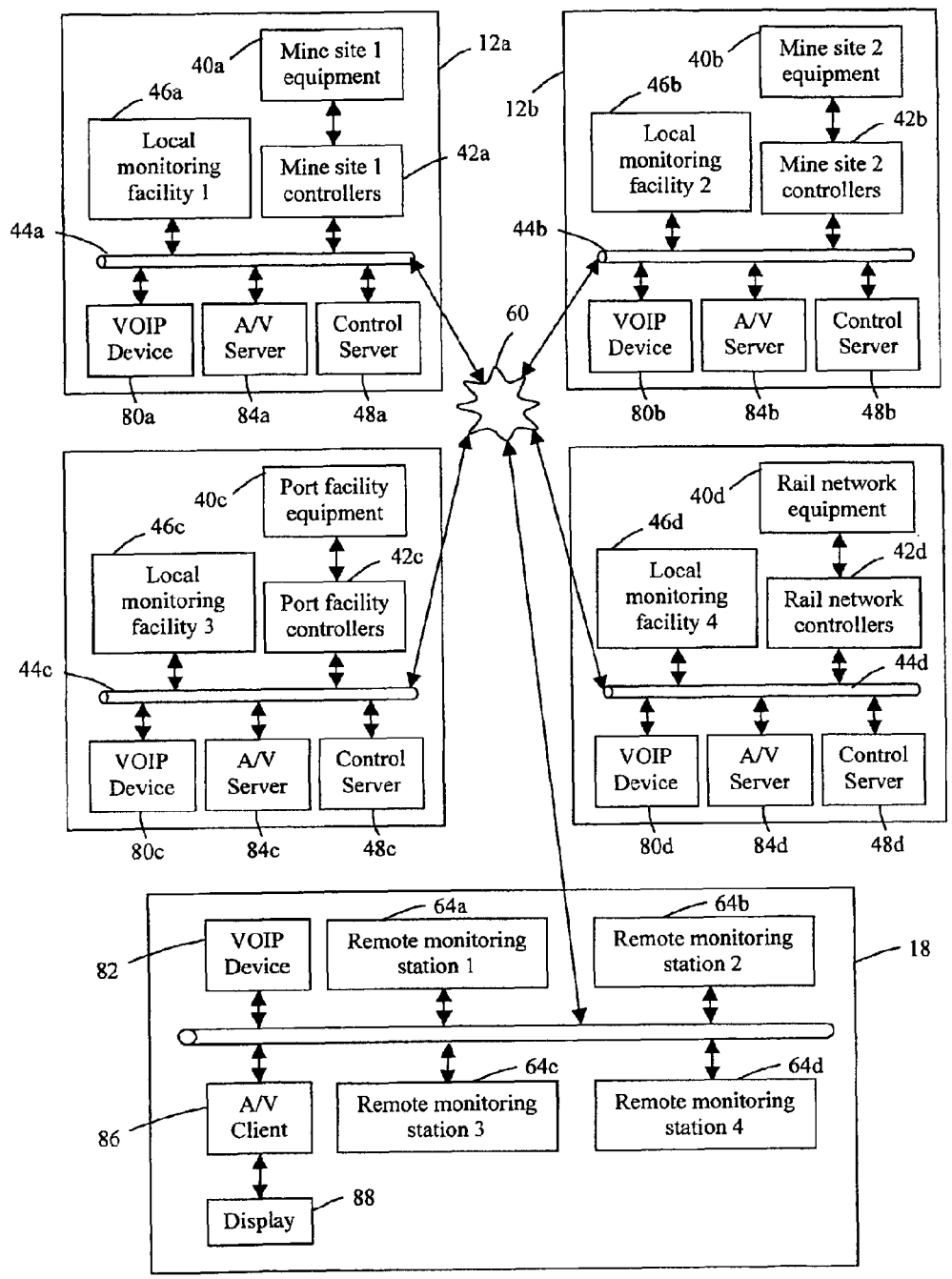
FIG. 2 is a block diagram illustrating a mine operation monitoring system according to an embodiment of the present invention.

As shown in FIG. 2, in this example each mine operation 12, 14, 16 also has one or more associated VOIP devices 80, each of which is capable of communicating with a VOIP device 82 disposed at the central monitoring facility, the VOIP devices 80, 82 being usable by personnel located at the mine operations 12, 14, 16 and at the central monitoring facility to communicate with each other through the wide area network 60 as required.

The system 10 in this example also includes an A/V server 84 disposed at each mine operation 12, 14, 16, the A/V server 84 being associated with an A/V client 86 disposed at the central monitoring facility 16 and arranged to communicate with the A/V servers 84 so as to receive audio/visual information from the mine operations 12, 14, 16 and in particular video information for displaying at the central monitoring facility, for example on a common display 88. For this purpose, the A/V server 84 may communicate with one or more still and/or video cameras disposed at selected locations at the mine operation 12, 14, 16 for example so that the status of particular activities occurring at the mine operations 12, 14, 16 may be visually monitored from the central monitoring facility 16.

In one arrangement, the cameras are also controllable from the central monitoring facility 18 so that the direction and/or magnification of the cameras may be modified from the central monitoring facility 18.

The A/V servers 84 may use a multi-cast protocol to transmit video images to the central monitoring facility 16. Typically, each remote monitoring station 64 accommodates a number of operators each with a number of terminals. Each operator may view simultaneously several video feeds of the plant and/or equipment they are controlling. A number of the operators at a remote monitoring station 64 may have a number of the same video feeds open on their terminals at the same time in order to effectively monitor and control the plant and/or equipment they are responsible for and to be aware of upstream and downstream activities within the operations they are controlling. Use of a multi-cast protocol in the transmission of video images from the mine operations to the central monitoring facility avoids unnecessary duplication of images and therefore unnecessary utilisation of bandwidth over the WAN.

In order to improve the reliability of communications between the central monitoring facility 18 and the mine operations 12, 14, 16, the system 10 may incorporate quality of service measures such as prioritizing communications through the WAN according to type.

In the present example, communications related to monitoring and control activities, and VOIP communications are given higher priority than CCTVV data, email and file transfers.

In an alternative arrangement, different types of communications are allocated different priority values which are used by routers in the WAN to manage queues in the routers and thereby the speed of transfer of the communication through the routers.

For example, the system may be arranged to allocate different bandwidth percentages to different types of communications, such as to communications related to monitoring and control activities, VOIP communications, CCTVV data, email, file transfers, and so on.

In one embodiment, priority values for each communication are allocated according to the IP addresses associated with the communication. For example, the IP addresses of all network enabled devices in the system 10 may be recorded in system network routers and the priority level allocated by the routers according to the priority level recorded for the network addresses in the routers. In one example, all communications to or from a network enabled device outside the system 10, that is, having an IP address that does not appear in the routers, is allocated the lowest priority level.

In the present embodiment, in order to provide a degree of protection against system failure, multiple network connection arrangements 90 may be provided for connecting the remote mine monitoring stations 64 with the wide area network 60 so that a backup network connection is available should one of the connections between the central monitoring facility 16 and the wide area network 60 fail.

Similarly, a power backup arrangement is provided such that should mains power 94 to the central monitoring facility 16 fail, the failure condition is detected by a suitable sensor 96 which actives a backup generator 98 to commence providing electrical power to the central monitoring facility 16.

For this reason, the central monitoring facility according to the present embodiment may be located at, or in the vicinity of, an airport of the type which already comprises suitable backup communications and power arrangements.

The system 10 may also be arranged to monitor whether communications between the central monitoring facility 18 and the mine operations are reaching their destination, for example by requiring a handshake to occur periodically between the central control facility 18 and the mine operations 12, 14, 16. In the present example, this is achieved by configuring the equipment controllers 42 to periodically send a heartbeat communication to an associated remote monitoring station 64. On receipt of the heartbeat communication, the remote monitoring station is arranged to send a reply signal indicating that the heartbeat communication has been received.

If the reply signal is not received, an alarm signal may be generated to indicate to appropriate personnel that an outage may have occurred between the central monitoring facility 18 and one of more mine operations 12, 14, 16.

Referring to FIG. 5, a conceptual layout of the central monitoring facility 16 is shown. In this example, two mine operations 12a, 12b, one port operation 14, and a rail network 16 are monitored and controlled from the central monitoring facility, with the port operation, rail network and each mine site having an associated separate monitoring station 64a, 64b, 64c, 64d and associated respective terminals 66a, 66b, 66c, 66d.

A display 88 is provided that is of a sufficiently large size such that information, such as data, images and/or video shown on the display is easily viewable by all operators associated with the remote monitoring stations 64, and in this example the common display 88 is separated into a plurality of display areas 100, each of which is associated with a different aspect of the mine operations.

In this example, each of the mine sites 12 and the port facility 14 has a dedicated remote monitoring station 64a, 64b, 64c such that plant and equipment associated with the port facility 14 or with a particular mine site 12 may be monitored and controlled from one monitoring station 64a, 64b, 64c. Similarly, the rail network 16 may be monitored from a single monitoring station 64d.

Figure 6:
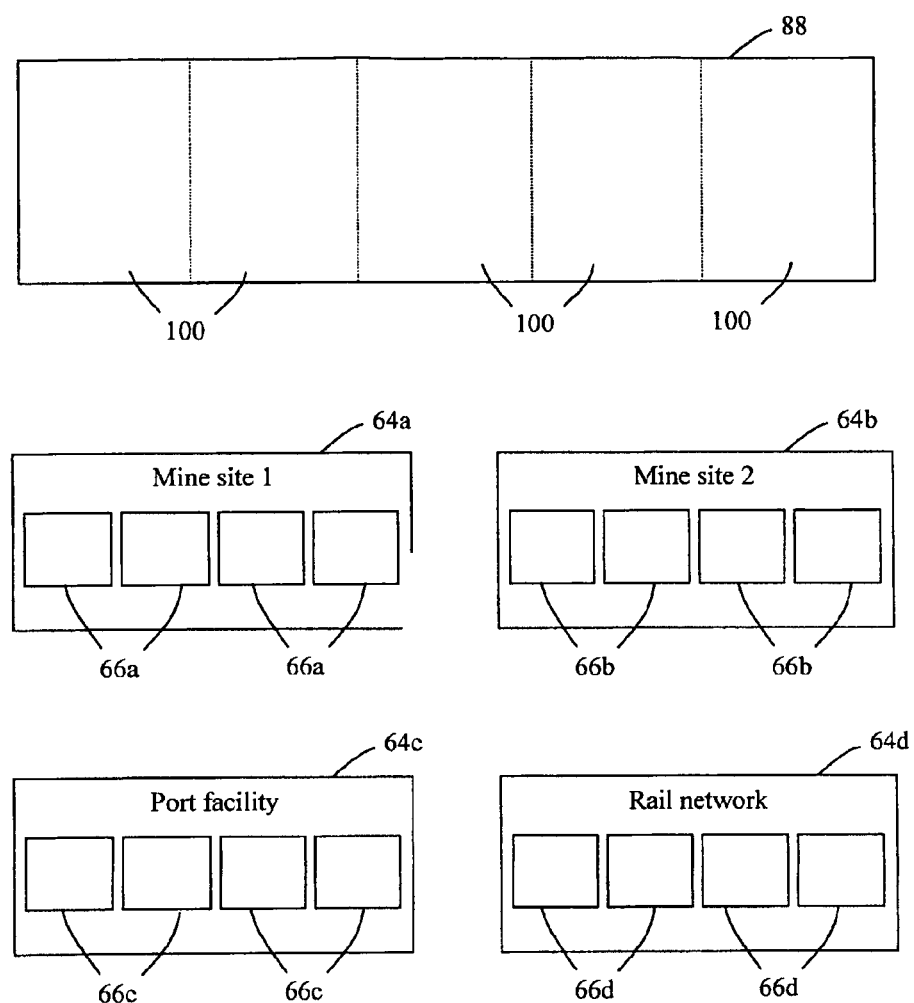
FIG. 6 is a conceptual diagram illustrating an example layout of components of the present invention disposed at the central monitoring facility.

A conceptual diagram of a wide area network 102 which may be used with the present invention is shown in FIG. 6. The diagram shows interconnected nodes, including mine operations 12, 14, 16 metropolitan offices 104 and the central monitoring facility 18. In order to improve reliability of the WAN 102, each node in the network is connected to at least two other nodes, and in some cases to four other nodes using respective communications links 106 so that should one or more of the communications links fail, traffic may be re-routed through other nodes and other communications links which are still active.

The operational data indicative of the operational status of equipment at the mine operations may be derived directly from the equipment interfaces associated with the equipment, and/or at least some of the operational data may be stored in a common database or in a plurality of associated databases which may be disposed at the same or different locations and extracted as required.

Figure 7:
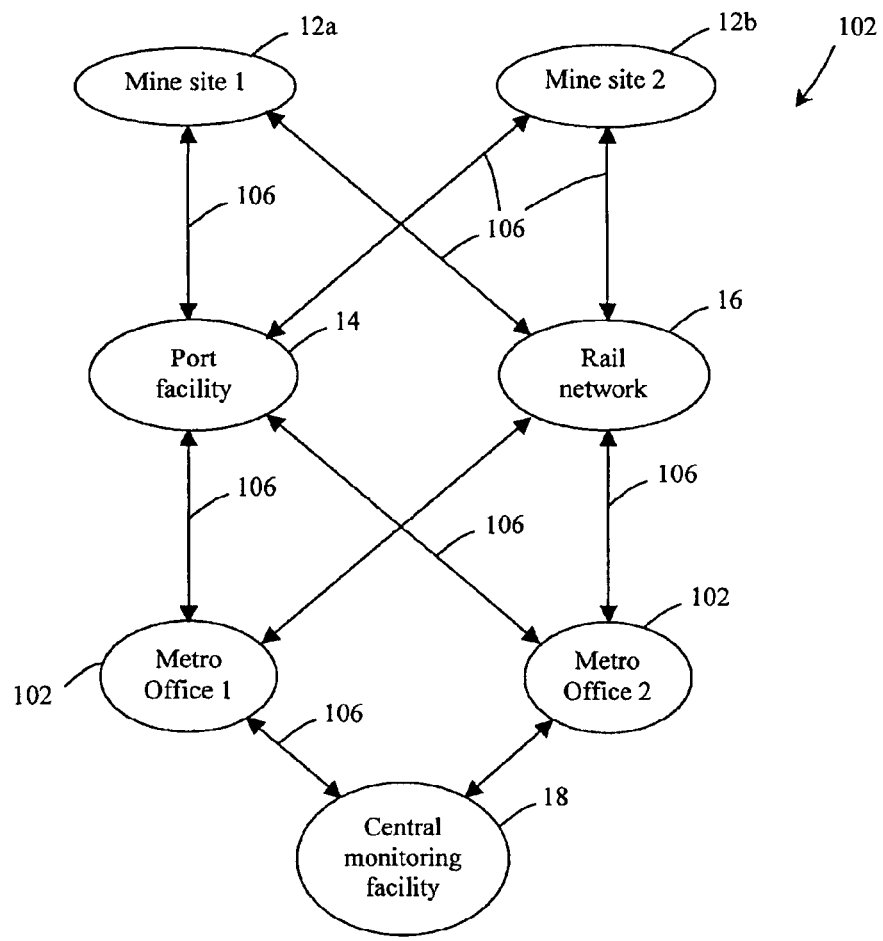
FIG. 7 is a diagrammatic representation of an example wide area network configuration which may be used in an embodiment of the present invention.

An example of a data storage and distribution infrastructure 120 used in the present monitoring system is shown in FIG. 7.

The infrastructure 120 includes a data source layer 122 having a plurality of databases 124, each of which is arranged to derive data from one or more sources from one or more mine operations, and an extraction/transformation layer 126 arranged to act on the data in the databases to produce data of suitable type for storage in a common data warehouse 128 in a data warehouse layer 130.

The data in the data warehouse 128 is organized into data cubes at a cubes layer 132 such that near real-time pre aggregated and highly indexed data is produced. This allows for sub second response times to queries.

The infrastructure 120 also includes a presentation layer 134 arranged to serve data in the data cubes to users on request, and a user front end layer 136 which comprises the common display and the terminals 66. The presentation layer 134 may be implemented using web browsers or any other suitable interface arranged to communicate with the presentation layer 134.

Figure 8:
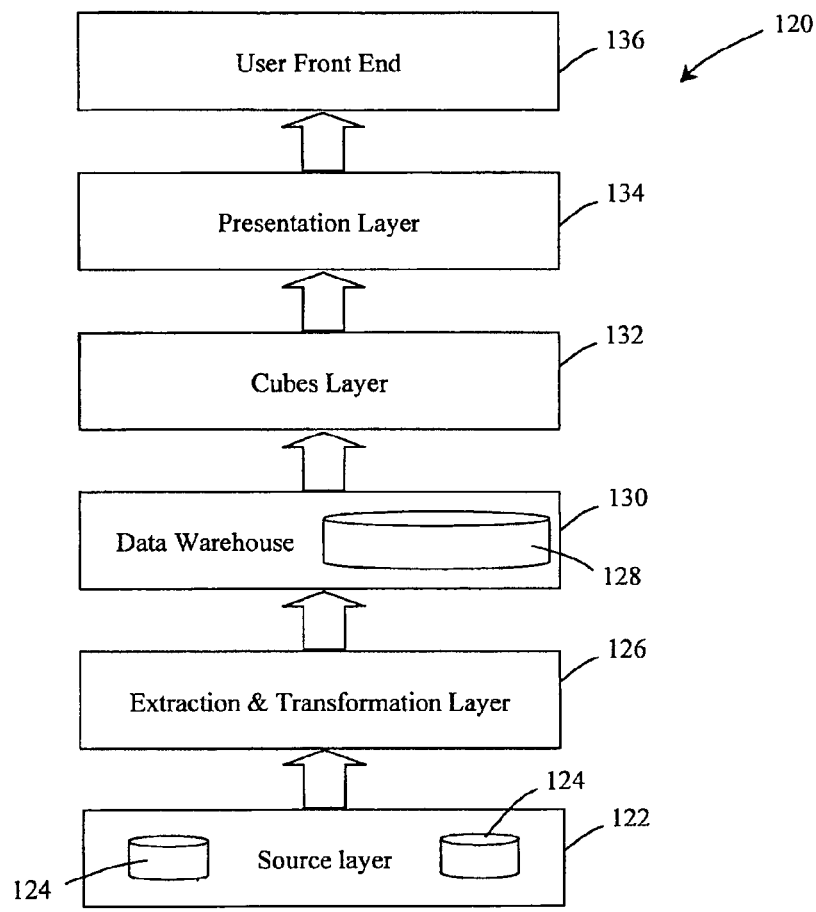
FIG. 8 is a software architecture diagram illustrating storage and handling of data in the mine operation monitoring system.
Figure 9:
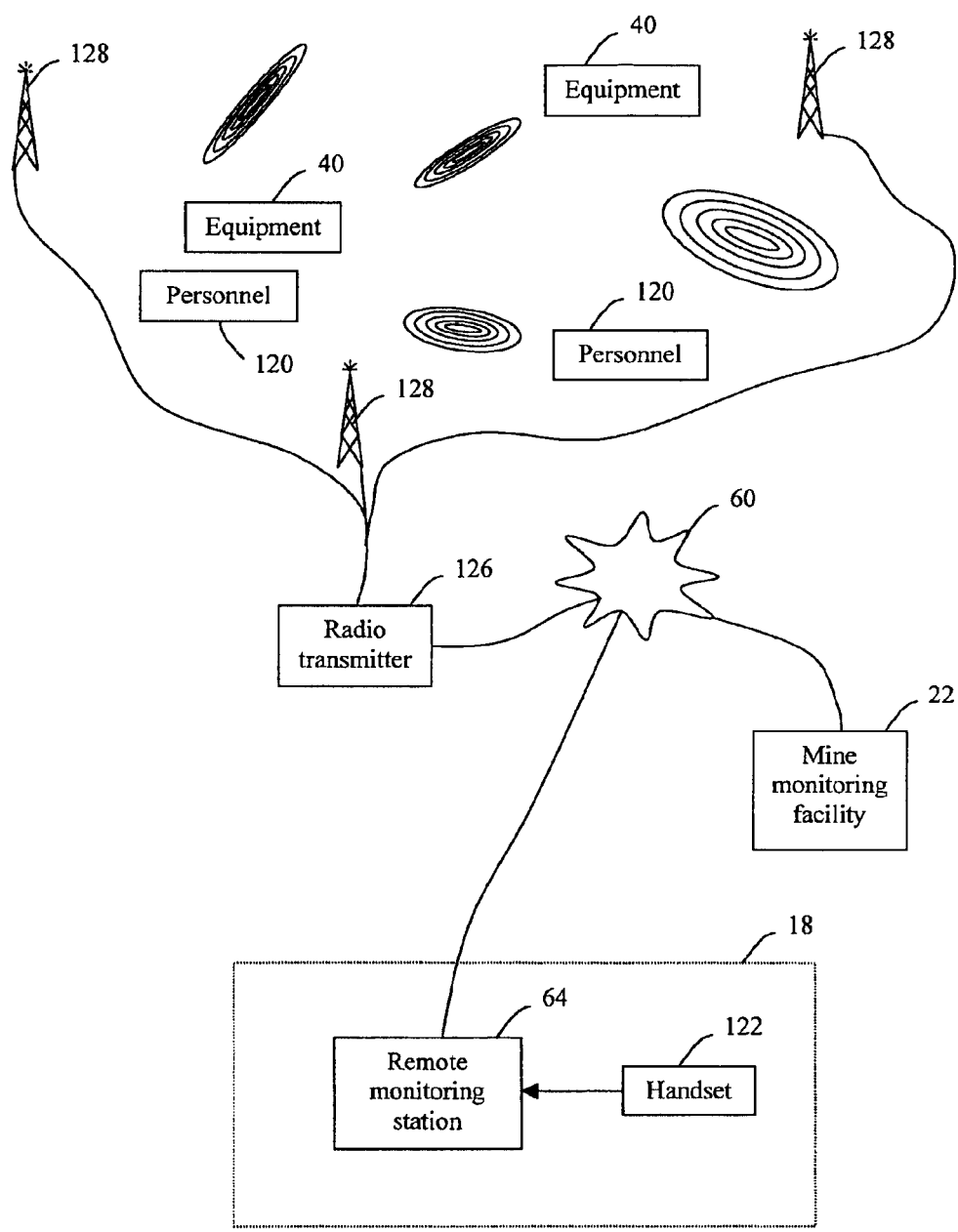
FIG. 9 is a conceptual diagram illustrating a mine operation including an audio messaging system of a mine operation monitoring system according to an embodiment of the present invention.

Referring to FIG. 8, there is shown a mine operation which includes an audio messaging system usable to transfer audible messages between personnel 140 at the mine operation and at the central monitoring facility 18. The audio messaging system includes an audio device, for example in the form of a handset 142, disposed at the central monitoring facility 18 and in this example arranged to interface with a remote monitoring station 64 at the central monitoring facility 18. Audio captured by the handset 142 is communicated through the wide area network 60 to the mine operation and at the mine operation is converted to an analogue signal which may be used by a radio transmitter 146 to drive one or more radio antennas 148. In this example, several radio antennas 148 are provided, with each radio antenna connected directly to the radio transmitter 146. However, other arrangements are possible. For example, the radio transmitter 146 may connect to one radio antenna 148, with the other radio antennas configured so as to repeat the received signal. The transmitted radio message is receivable by all radio equipped handsets carried by the mine personnel 140. Similarly, audio received by a radio handset carried by a person at a mine operation is received by a radio antenna 148, is converted to suitable digital signal and communicated through the wide area network 60 to the central monitoring facility 18 and to the handset 142.

In this way, it is possible for an operator at the central monitoring facility 18 and one or more people at a mine operation to send audio messages to each other in a cost effective simple way.

In the present example, each remote monitoring station has an associated handset usable to communicate with personnel at a mine operation. However, it will be understood that other arrangements are envisaged. For example, the central monitoring facility 18 may be provided with one or more common handsets configured to communicate with any mine operation.

It will be understood that communications between network enabled devices on the system may be communicated in a unicast or multicast way depending on communication type. For example, A/V communications and communications associated with the audio messaging system may be communicated in a multicast way such that any IP address associated with the system is able to receive the communication. Alternatively, communications such as from an equipment interface to the central monitoring facility may be communicated in a unicast way.

Modifications and variations as would be apparent to a skilled addressee are deemed to be within the scope of the present invention.

The invention claimed is:

1. A mine operation monitoring system comprising:
a plurality of equipment interfaces, each equipment interface being located at a mine operation and being associated with at least one item of mine equipment, and each equipment interface being arranged to monitor and control operation of the at least one associated item of equipment;
a plurality of remote monitoring stations remotely located relative to at least one of the mine operations at a remote monitoring facility, each remote monitoring station being arranged to communicate with a plurality of equipment interfaces associated with a different mine operation so as to monitor and control operation of a plurality of items of mine equipment associated with the equipment interfaces from the remote monitoring station; and
a plurality of local monitoring stations, each local monitoring station being located at a mine operation, and being arranged to communicate with the equipment interfaces associated with the mine operation so as to monitor and control operation of the items of equipment associated with the equipment interfaces from the mine operation;
a communications network arranged to facilitate communications between the equipment interfaces, the local monitoring stations and the remote monitoring stations;
at least one control server, each control server associated with a mine operation and each control server arranged to receive control commands for at least one item of equipment associated with the respective mine operation and to generate control signals for controlling operation of the at least one item of equipment in response to the control commands;
whereby a plurality of items of equipment associated with multiple mine operations are monitorable and controllable from the remote monitoring facility and each item of equipment is also monitorable and controllable from the respective local monitoring station; and
wherein the system is arranged to prioritize communications between the mine operations and the remote monitoring facility according to communication type.

2. A system as claimed in claim 1, comprising at least one local A/V device disposed at a mine operation and arranged to capture audio and/or video information from the mine operation and at least one remote A/V client device disposed at the remote monitoring facility, the local and remote A/V devices facilitating audio and/or video communications between the mine operation and the remote monitoring facility.

3. A system as claimed in claim 2, wherein the system is is arranged to use a multi-cast protocol to transmit A/V communications indicative of the audio and/or video information to the remote monitoring facility such that multiple operators are able to simultaneously receive the A/V communications.

4. A system as claimed in claim 1, wherein the mine operations comprise at least one mine site, at least one port facility and/or at least one rail network.

5. A system as claimed in claim 1, wherein the system is arranged to monitor whether communications between the remote monitoring facility and the mine operations are possible and to generate an alarm signal when an indication is obtained that a communications outage may have occurred between the remote monitoring facility and one of more mine operations.

6. A system as claimed in claim 5, wherein the system is arranged to require that a handshake occurs periodically between the remote monitoring facility and the mine operations.

7. A system as claimed in claim 1, wherein the system is arranged to prioritise communications by allocating different bandwidth percentages to different types of communications.

8. A system as claimed in claim 1, wherein the system is arranged to prioritise communications by allocating different priority values to different types of communications, the priority values usable by routers in the communications network to manage queues in the routers and thereby the speed of transfer of the communications through the routers.

9. A system as claimed in claim 8, wherein the priority values are allocated according to the IP addresses associated with a communication.

10. A system as claimed in claim 9, wherein all communications to or from a network enabled device having an IP address that is not associated with a communication between a mine operation and the remote monitoring facility are allocated a priority level lower than communications between a mine operation and the remote monitoring facility.

11. A system as claimed in claim 1, wherein the communications network comprises multiple network paths for transferring communications between each mine operation and the remote monitoring facility so that a backup network connection is available should one or more network connection fail between the mine operations and the remote monitoring facility.

12. A system as claimed in claim 1, wherein the system is arranged such that mine equipment is monitorable and controllable within a web browser.

13. A system as claimed in claim 1, comprising an audio messaging system usable to communicate audio between personnel at a mine operation and the remote monitoring facility.

14. A system as claimed in claim 13, wherein the audio messaging system includes at least one radio transmitter disposed at the mine operation, and at least one portable radio receiving device for use by mine personnel at the mine operation;
  data indicative of audio information received at the monitoring station being communicated to the radio transmitter through the communications network;
  the audio messaging system being arranged to convert the data to a radio signal indicative of the audio information; and
  the radio transmitter being arranged to transmit the radio signal to one or more of the radio receiving devices.

15. A system as claimed in claim 1, wherein the system comprises multiple network connection arrangements for connecting the remote monitoring stations with the communications network so that a backup network connection is available should one of the network connections between the remote monitoring facility and the communications network fail.

16. A system as claimed in claim 1, wherein the system comprises multiple power supply arrangements for supplying electrical power to the remote monitoring facility such that should supply of electrical power by one of the power supply arrangements to the remote monitoring facility fail, another power supply arrangement is used to provide the remote monitoring facility with electrical power.

17. A system as claimed in claim 1, wherein the remote monitoring facility is disposed at or adjacent an airport.

18. A system as claimed in claim 1, comprising at least 4 remote monitoring stations.

19. A method of monitoring mine equipment at a plurality of mine operations, said method comprising:
  providing a plurality of mine equipment interfaces, each mine equipment interface being located at a mine operation and being associated with at least one item of mine equipment;
  arranging each mine equipment interface to monitor and control operation of at least one item of mine equipment associated with the mine equipment interface;
  providing a plurality of adjacently disposed remote monitoring stations remotely located relative to the mine operations at a remote monitoring facility;
  facilitating communications between each remote monitoring station and a plurality of equipment interfaces associated with a different mine operation so as to monitor and control operation of a plurality of items of mine equipment associated with the equipment interfaces from the remote location;
  providing a plurality of local monitoring stations, each local monitoring station being locally located at a mine operation;
  facilitating communications between each local monitoring station and the equipment interfaces associated with the mine operation so as to monitor and control operation of the items of equipment associated with the equipment interfaces from the mine operation;
  providing a control server at at least one mine operation, the control server generating control signals for controlling operation of at least one item of equipment in response to received control commands;
  monitoring a plurality of items of equipment associated with multiple mine operations either from the remote monitoring facility or from respective local monitoring stations;
  controlling a plurality of items of equipment associated with multiple mine operations either from the remote monitoring facility or from respective local monitoring stations by sending control commands to the respective control server from the remote monitoring facility or from a local monitoring station; and
  prioritizing communications between the mine operations and the remote monitoring facility according to communication type.

20. A method as claimed in claim 19, comprising:
  providing at least one local A/V device disposed at a mine operation;
  capturing audio and/or video information from the mine operation using the local A/V device;
  providing at least one remote A/V device disposed at the remote monitoring facility; and
  communicating audio and/or video communications between the mine operation and the remote monitoring facility using the local and remote A/V devices.

21. A method as claimed in claim 20, comprising transmitting A/V communications indicative of the audio and/or video information from a mine operation to the remote monitoring facility such that multiple operators are able to simultaneously receive the A/V communications.

22. A method as claimed in claim 19, comprising monitoring whether communications between the remote monitoring facility and the mine operations are possible and generating an alarm signal when an indication is obtained that a communications outage may have occurred between the remote monitoring facility and one or more mine operations.

23. A method as claimed in claim 19, comprising providing an audio messaging system usable to send audio between personnel at a mine operation and the remote monitoring facility.

24. A method as claimed in claim 23, comprising:
  providing at least one radio transmitter disposed at the mine operation;
  providing at least one portable radio receiving device for use by mine personnel at the mine operation;
  communicating data indicative of audio information received at the monitoring station to the radio transmitter;
  converting the data to a radio signal indicative of the audio information; and using the radio transmitter to transmit the radio signal to one or more of the portable radio receiving devices.

25. A method as claimed in claim 19, comprising providing multiple network connection arrangements for connecting the remote monitoring stations with the communications network so that a backup network connection is available should one of the network connections between the remote monitoring facility and the communications network fail.

26. A method as claimed in claim 19, comprising providing multiple power supply arrangements for supplying electrical power to the remote monitoring facility such that should supply of electrical power by one of the power supply arrangements to the remote monitoring facility fail, another power supply arrangement is used to provide the remote monitoring facility with electrical power.

27. A method as claimed in claim 19, comprising providing at least 4 remote monitoring stations.

* * * * *